March 28, 1933. F. SIMPSON 1,903,071
PHOTOGRAPHY LIGHT REFLECTOR
Filed Jan. 23, 1932 2 Sheets-Sheet 1

Inventor
Frank Simpson
By Clarence A. O'Brien
Attorney

Patented Mar. 28, 1933

1,903,071

UNITED STATES PATENT OFFICE

FRANK SIMPSON, OF FORT WORTH, TEXAS

PHOTOGRAPHY LIGHT REFLECTOR

Application filed January 23, 1932. Serial No. 588,378.

This invention relates to a portable appliance for use in the photography industry and primarily adapted for studio portrait work but equally well usable for motion picture photography.

The purpose of the invention is to provide an effective reflector for artificial and natural light capable of developing and providing the requisite light protection facilities for illuminating the object in a more dependable manner in order to obtain clear and superior pictures.

In designing this improved reflector and light assembly, I have originated it with a view toward softening the shadows of any photograph and making the features of the objective appear softer and whiter for more accurate and efficient photographing.

The specific structural parts selected and organized to accomplish this progressive step in the technique of photography will become more readily apparent from the following description and the accompanying illustrative drawings.

Figure 1:
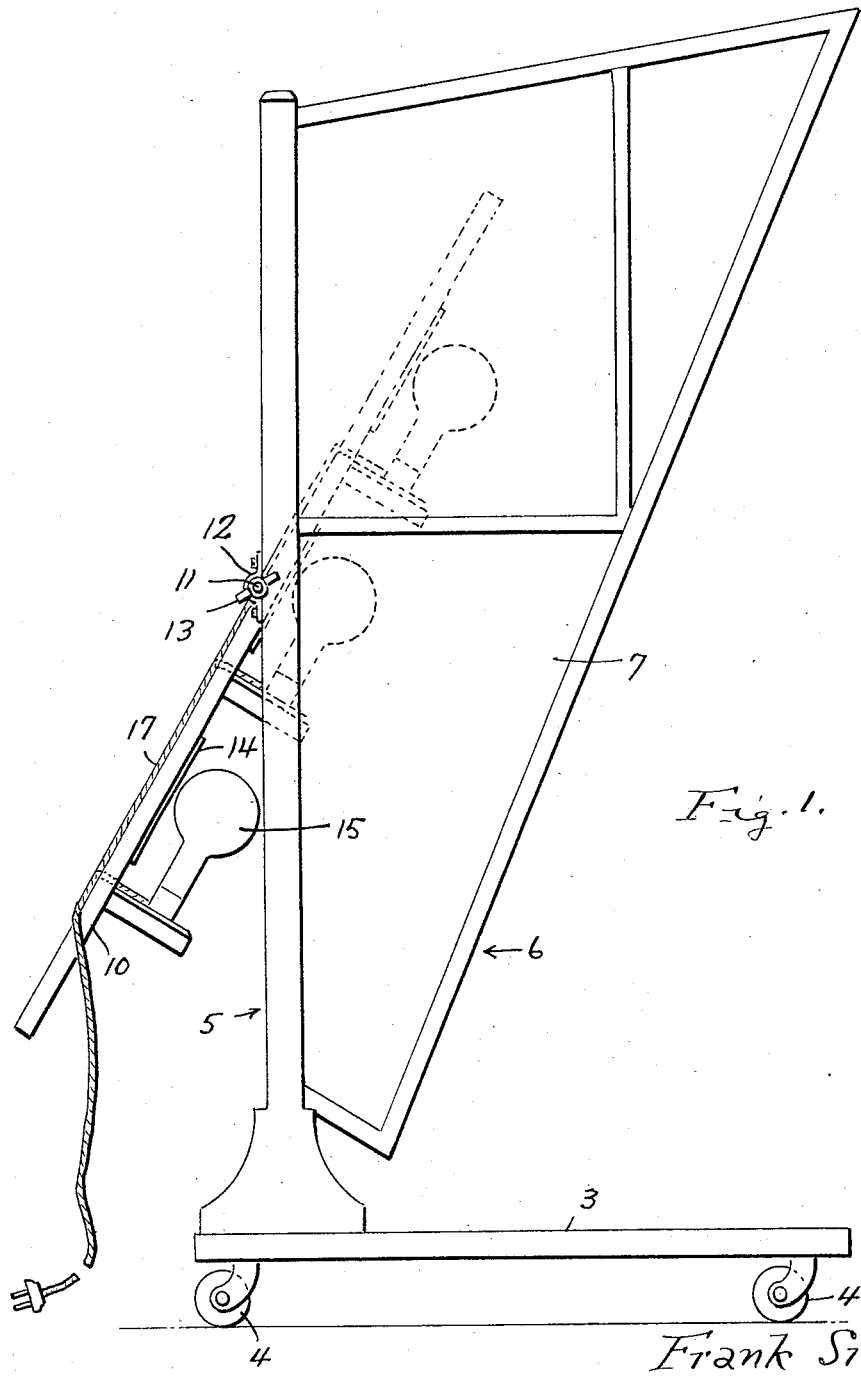
Figure 1 is an end elevational view of a structure developed in accordance with the invention.
Figure 2:
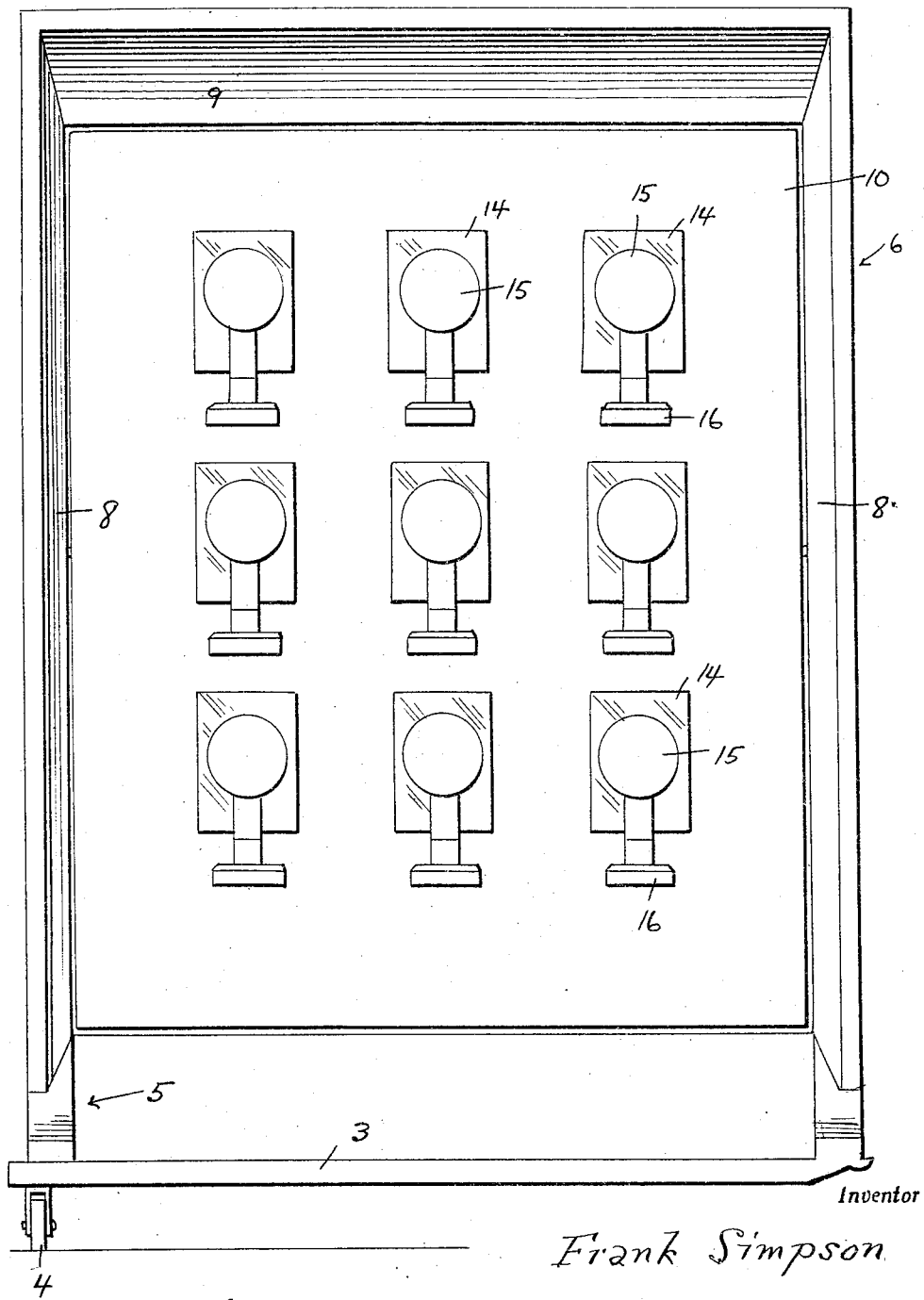
Figure 2 is a front elevational view of the same.

In the drawings the support comprises a suitable base plate 3 provided with casters 4 of appropriate construction and suitable arrangement to facilitate movement from place to place in the studio. Rigidly attached to and rising from the rear edge of the base is an arched upright 5 to which the light concentration shield 6 is fastened. This shield includes a suitable framework structure 7 carrying three walls.

The opposed vertical side walls 8 diverge forwardly and outwardly. Moreover, in side elevation, these walls are gradually decreased in width from the top to the bottom of the structure. The top wall 9 is deflected upwardly. Thus the companion relationship of the walls are such as to provide unobstructed light beam projection.

An important part of the structure is the reflecting panel 10. This is preferably rectangular and includes pintles 11 mounted in bearing brackets 12 and provided with thumb nuts 13. This provides a pivotal attachment of the panel to the support at a point between the opposite upper and lower ends of the panel. Otherwise stated, the panel is pivoted centrally so as to permit it to swing back and forth to the requisite angle according to the existing conditions in the studio at the time of use.

The effective light reflecting surface of the panel is aluminum coated and preferably by leaf aluminum. Attached to the reflecting surface in suitably spaced relationship and rows are light reflecting mirrors 14 and arranged in front of each mirror is an electric bulb 15 supported from an appropriate shelf or bracket 16. The numeral 17 merely designates the electricity conducting cord or cable.

The gist of the invention is in the provision of a suitable support including a roller equipped base having a vertical frame carrying a hood-like shield, the walls of said shield being disposed in appropriate diverging companion relationship. This, together with the swingable panel aluminum coated, provided with a multiplicity of mirrors and co-related electric bulbs provides a unique ensemble capable of effective light ray projection.

It has been discovered that an arrangement incorporating a battery of electric bulbs disposed in co-ordinated relationship with properly arranged and spaced mirrors, and the mounting of the mirrors on an aluminum faced adjustable panel with said panel co-operating with the forwardly projecting hood or shield provides a unique structural arrangement which facilitates the making of more effective portraits and pictures.

The light beams projected through the medium of this arrangement are subdued to a degree and quality to perfect the work of the photographer in a simple and economical manner.

The aluminum coating surface of the panel softens the mercury effect of the mirror and when the device is used in photographing persons the skin of the photograph has a soft white texture.

The adjustability of the panel is an important feature in that it permits proper regulation for child and adult photography and for many other conditions which the photographer must cope with.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a structure of the class described, a portable base, an upright carried thereby, a forwardly projecting multiple walled light concentrating shield carried by said upright, a panel mounted on horizontal axes in said upright for tiltable adjustment with respect to the shield, the reflecting surface of said panel being coated with aluminum, a plurality of vertically spaced horizontal rows of mirrors mounted on the aluminum coated surface of the panel, and a plurality of distinguishable electric bulbs carried by the panel each bulb being arranged in spaced relation in front of a mirror.

In testimony whereof I affix my signature.

FRANK SIMPSON.